US007907746B2

(12) United States Patent
Oki

(10) Patent No.: US 7,907,746 B2
(45) Date of Patent: Mar. 15, 2011

(54) MEDIA RECOGNITION SYSTEM

(75) Inventor: Yasuyuki Oki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1202 days.

(21) Appl. No.: 11/494,707

(22) Filed: Jul. 28, 2006

(65) Prior Publication Data
US 2007/0223534 A1 Sep. 27, 2007

(30) Foreign Application Priority Data

Mar. 23, 2006 (JP) .................................. 2006-080473

(51) Int. Cl.
*G06K 9/00* (2006.01)
(52) U.S. Cl. ....................................... 382/100; 370/486
(58) Field of Classification Search .................. 370/486; 382/100
See application file for complete search history.

(56) References Cited

U.S. PATENT DOCUMENTS 5,963,203 A * 10/1999 Goldberg et al. ............. 715/723
6,573,907 B1 * 6/2003 Madrane ....................... 715/719

OTHER PUBLICATIONS

Mark D. Pesce, Programming Microsoft DirectShow for Digital Video and Television, p. 3 DirectShow Concepts, 2003.

* cited by examiner

*Primary Examiner* — Samir A Ahmed
*Assistant Examiner* — Ruiping Li
(74) *Attorney, Agent, or Firm* — Antonelli, Terry, Stout & Kraus, LLP.

(57) ABSTRACT

A media recognition system comprises an object management space, an object processing module and a media object space for storing media objects generated by object processing, wherein a pattern definition list stored in the object management space includes a plurality of action statements defining script programs to be executed in association with pattern formulas which designate the attributes of objects. The object processing module generates a new media object having different attributes by executing media processing corresponding to the input media object based on the pattern definition list, and repeats recursive media processing on the generated media object as the new input media object in accordance with the pattern definition list.

8 Claims, 8 Drawing Sheets

MEDIA RECOGNITION SYSTEM

CLAIM OF PRIORITY

The present application claims priority from Japanese application serial No. 2006-080473, filed on Mar. 23, 2006, the content of which is hereby incorporated by reference into this application.

BACKGROUND OF THE INVENTION

The present invention relates to a media recognition system, and more particularly to a media recognition system and an application program for media recognition to execute recognition processing of a media data stream of audiovisual and audio signals in accordance with a user's request.

Along with the development of audiovisual technology, application software for recording and/or playing images and music has come to permit configuring with comparative ease. Expectations are now rising of sophisticated media recognition applications which are not limited to mere playing of recorded images, but permit automatic recognition of a specific object, such as goods or a person, and a specific sound or sounds, and access to detailed information on the object by utilizing the result of recognition. Various algorithms to constitute the basis of recognition techniques are proposed under the ISO MPEG-7 Standard.

Media information which is offered as images is appreciated from different points of view depending on the user, and the object noted even in the same frame may differ from one user to another. Therefore, when a specific object in an image is to be automatically recognized by an media recognition application, it is necessary to match the form of designating the media content (also referred to as metadata or media characteristic quantity) to be recognized and the form of displaying and the method of utilizing the result of recognition, with user's preference.

FIG. 8 shows an example of conventional media recognition application for handling media information which continuously arises on a real time basis (hereinafter referred to as a media data stream) such as images and sounds. FIG. 8 is prepared to illustrate the basic structure of application software according to the prior art, and shows the configuration of an media recognition application provided with a function of recognizing a specific object region in an MPEG played image displayed on the screen, analyzing color distribution in the object region and displaying the result of analysis on the screen. If a function, for instance, of recognizing a person or an object included in the object region is added instead of color distribution analysis, identifying information for accessing detailed information on the object can be obtained.

Reference numeral 100 denotes an image playing application for decoding MPEG encoded data read out from a picture file 130 and outputting sounds to a speaker 110 and images to a display 120. The image playing application 100 comprises an MPEG file reading module 101 for reading out MPEG encoded data from the picture file 130 and outputting them as a bit stream of each picture frame, and a media separation module 102 for separating the bit stream into an audio bit stream and a video bit stream.

The audio bit stream is decoded by a voice decoding module 103 and outputted to the speaker 110 as, for instance, a PCM audio waveform signal stream. On the other hand, the video bit stream is decoded by a MPEG picture decoding module 104 and outputted to the display 120 as a picture signal stream.

As stated above, a conventional image playing application has a data flow type program structure in which a plurality of program modules are linked according to the sequence of data processing and the data stream is consecutively processed. This program structure derives from the component-connecting type design concept, such as that of a digital TV broadcast receiver and a video player such as a digital versatile disk (DVD) player configured of hardware circuits. For instance, Directshow (API), which is an OS-standard image playing framework in Microsoft Windows®, also uses a program structure of this type. As the data processing sequence can be readily imaged in a data flow type program structure in which data is successively transferred from preceding modules to subsequent modules, it has an advantage of permitting instinctive understanding of the functions of the application over a variable rewriting type program using a procedural language.

In order to develop the image playing application 100 into an image (media) recognition application provided with a recognizing function regarding a specific object region in an image, or a color distribution analyzing function in this context, a region recognition module 105 for recognizing the existing region of a certain object in a picture frame is connected to the MPEG picture decoding module 104 for instance.

The result of recognition by the region recognition module 105 should be displayed on a played image screen in a user-manipulable form. For this purpose, a region graphical user interface (GUI) module 106 is connected between the region recognition module 105 and the display 120. If color analysis of the picture frame is desired, a color analysis module 107 is connected to the MPEG picture decoding module 104 and, in order to display the result of the color analysis on the played image screen, a color-display graphical user interface (GUI) 108 is connected between the color analysis module 107 and the display 120.

According to those additional modules 105 through 108, it is able to construct an image recognition application capable of executing region recognition and color analysis in parallel with image playing by the image playing application 100 and displaying, as shown in a display example 121, the result of region recognition and that of color analysis on the screen. In this case, connections among the modules can be either embedded in a software module or defined in a module connection table such as the one denoted by 122. Incidentally, the above-stated prior art is described in Mark D. Pesce, Programming Microsoft DirectShow for Digital Video and Television, p. 3 DirectShow Concepts, 2003.

SUMMARY OF THE INVENTION

Sophisticated media recognition applications require combinations of diverse media recognition techniques. The media recognition technique required for a given media recognition application may be different depending on the user of it. However, as the module-connected type conventional media recognition application described above has a configuration of connecting a plurality of modules in a fixed way, if an application function meeting a given user's requirements has to be realized with the module-connected type, the designer of the application will have to select modules matching the user's needs and combine these modules, taking the input/output specifications of them into consideration.

It is not impossible to dynamically switch over the relationships in connection among the modules according to the user's needs. However, it is not easy to make available an application such that a large number of modules are prepared in advance in a single media recognition application so as to be adaptable to diverse needs of users and to be operable by changing the inter-module connections as required.

Moreover, a media recognition application may require, for instance, the results of media recognition for a certain period of time or judgment processing utilizing a plurality of kinds of recognition results. However, the module-connected type structure of the conventional media recognition application is unsuitable for media processing that requires storing and searching of such recognition results or utilizing a plurality of kinds of recognition results.

An object of the present invention is to provide a media recognition system and an application program for media recognition adaptive flexibly to different user needs than the prior art.

In order to accomplish the above object, an application program for media recognition according to the invention comprises an object management space, an object processing module for processing input media objects in accordance with a pattern definition list stored in the object management space, and a media object space for storing new media objects generated by the object processing module, the pattern definition list including a plurality of action statements defining script programs to be executed in association with pattern formulas designating the attributes of media objects. The invention also includes a computer-readable storage medium for storing the application program for media recognition.

A feature of the invention resides in that the object processing module selects a script program corresponding to an input media object based on a pattern formula indicated by the pattern definition list, generates a new media object having different attributes by executing media processing in accordance with the script program, repeats recursive media processing on the generated media object as the new input media object according to the pattern definition list, and selectively outputs a media object having attributes pre-designated by the pattern definition list to the media object space and the display unit.

According to one aspect of the invention, the object processing module comprises an object reception unit for reading in the media objects supplied successively and the newly generated media objects in order of generation, a pattern matching unit for receiving a media object from the object reception unit, matching media identifying information attached to the media object with a pattern formula indicated by the pattern definition list, and selecting a script program to be executed, and a script executer for executing a script program. The script executer executes the script program selected by the pattern matching unit, and supplies a generated media object to the object reception unit as a new input media object. Incidentally, the object processing module and its configurative components may be composed of programs and a processor for executing information processing in accordance with the program.

According to another aspect of the invention, the pattern matching unit stores media objects generated by the script executer into the media object space, and outputs a media object having specific attributes pre-designated in the pattern definition list to the display unit.

A media recognition system according to the invention comprises a processor, a memory, a display unit having a display screen, and an input device, wherein an object management space and a media object space are defined in the memory, and the processor executes the object processing module described above.

According to the invention, since the relationships between pattern formulas designating the attributes of each media object and a script program to be executed are defined in the pattern definition list, and a script program designated by the pattern definition list is executed on the inputted media object, it is able to perform appropriate media processing depending on the attributes of the input media object.

Further, according to the invention, when another media object having different attribute is generated as the result of data processing on an input media object in accordance with a script program, recursive media processing is repeated on the generated media object as a new input media object in accordance with the pattern definition list, so that flexible linkage between modules (script programs) which is difficult with any conventional module-connected type application can be realized.

DESCRIPTION OF THE PREFERRED EMBODIMENTS

A preferred embodiment of the present invention will be described with reference to drawings.

Figure 1:
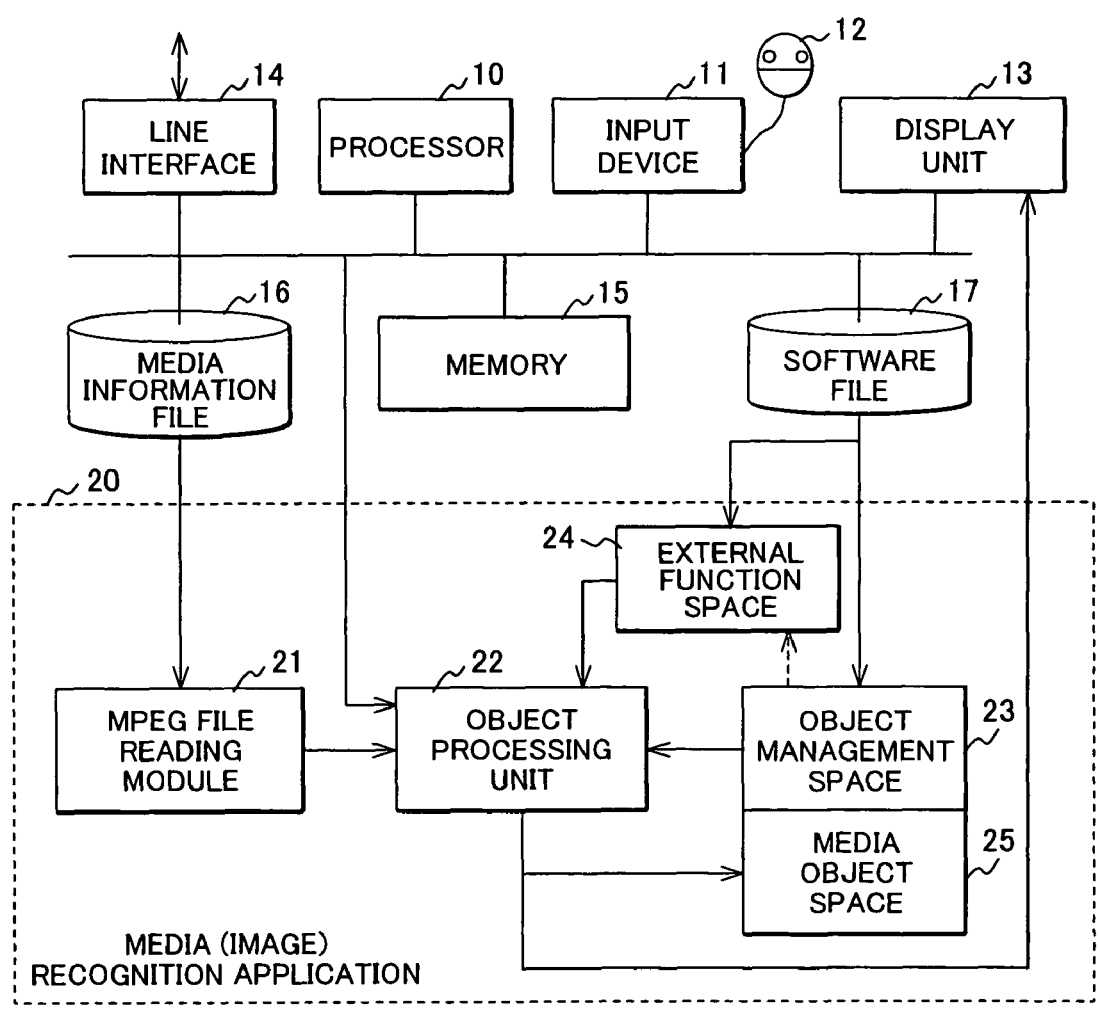
FIG. 1 is a block diagram showing a media recognition system according to an embodiment of the present invention.

FIG. 1 shows an example of configuration of the media recognition system according to the invention. The media recognition system according to the invention comprises a processor 10, an input device 11 including a keyboard and a mouse 12, a display unit 13, a line interface 14 for connecting to the Internet, a memory 15, a media information file 16, a software file 17, and an internal bus for connecting these elements. Reference numeral 20 denotes a media recognition application according to the invention.

The substance of the media recognition application 20 resides in the memory 15 and is executed by the processor 10. In FIG. 1, however, to facilitate understanding of the relationships among the media information file 16, the software file 17 and the display unit 13, the media recognition application 20 is shown in a form independent of the memory 15. Further, in order to simplify description, recognition application for processing only video data will be described in this embodiment by eliminating the description of the audio processing function. In the following description, therefore, the media recognition application 20 will be referred to as an image recognition application.

The image recognition application 20 of this embodiment comprises an MPEG file reading module 21 for reading out an MPEG file from the media information file 16 and an object processing unit 22 connected to the MPEG file reading module 21. An object management space 23, an external function space 24 and a media object space 25 are associated as memory regions with the object processing unit 22.

In the object management space 23, a pattern definition list down loaded from the software file 17 and other data are stored. In the external function space 24, external functions selectively read out from the software file 17 are stored. The relationship between the pattern definition list and the external functions will be described in detail later.

The MPEG file reading module 21 reads out MPEG-encoded file data from the media information file 16, and supplies a bit stream of picture frame units to the object processing unit 22. A header including object identifying information is attached to the bit stream of picture frame units outputted from the MPEG file reading module 21. In this embodiment, the bit stream supplied from the MPEG file reading module 21 to the object processing unit 22 will be referred to as a bit stream object.

The object processing unit 22 processes the bit stream object by using the pattern definition list 230 stored in the object management space 23 and external functions 240 stored in the external function space 24.

The object processing unit 22 executes recursive media processing on a new media object generated as the result of processing the bit stream object. The object processing unit 22 also executes media processing on a newly generated media object by using, if necessary, cursor coordinate values variable depending on the manipulation of the mouse 12. The new object generated by the object processing unit 22 is stored into the media object space 25. An object having attributes designated in advance in the pattern definition list is outputted to the display unit 13.

Figure 2:
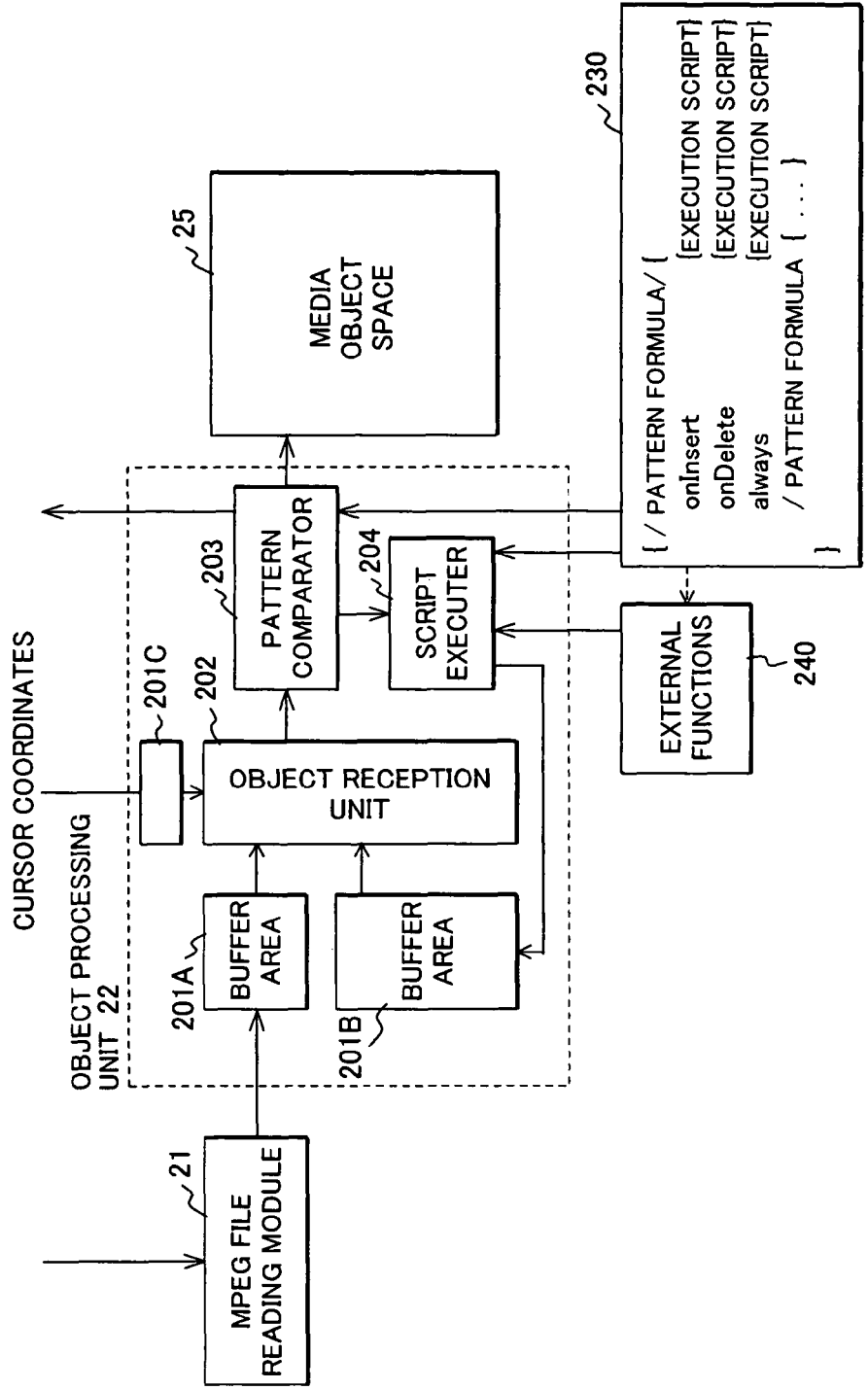
FIG. 2 is a block diagram showing details of a media recognition application 20 shown in FIG. 1.

FIG. 2 is a more detailed configuration diagram of the media (image) recognition application 20. The object processing unit (program module) 22 is provided with a buffer area 201A for temporarily storing the bit stream object supplied from the MPEG file reading module 21, a buffer area 201B for temporarily storing the new media object generated by the object processing unit 22 as will be described afterwards, and a buffer area 201C for storing cursor coordinate values. The objects and cursor coordinate values stored in these buffer areas are supplied to a pattern comparator 203 through an object reception unit 202. Each of the objects entered into the object reception unit 202 has a header including object identifying information.

According to a pattern formulas stated in the pattern definition list 230, the pattern comparator 203 evaluates object identifying information indicated in each object supplied from the object reception unit 202.

The pattern definition list 230 comprises a plurality of action statements representing execution scripts (script programs) in association with pattern formulas for specifying objects as will be described in detail with reference to FIG. 3. The pattern definition list 230 includes, for instance, an action statement for decoding a bit stream object to convert it into a picture object; an action statement for executing predetermined picture processing on a picture object to generate a new object having another attribute; and an action statement for executing processing on the new object to generate another new object having still another attribute. The pattern definition list 230 also includes an action statement for instructing outputting of an object designated by a pattern formula to the display unit 13.

When the identifying information of an object supplied from the object reception unit 202 satisfies any of pattern formulas, that is the result of evaluation is true, the pattern comparator 203 instructs a script executer 204 to execute processing on the object in accordance with an execution script corresponding to the pattern formula. Then the pattern comparator 203 stores the object into the media object space 25.

The script executer 204 processes the object in accordance with the execution script specified by the pattern comparator 203, and supplies a newly generated object to the buffer area 201B. Picture processing that is too sophisticated for the execution script to state in the pattern definition list 230 is executed by using, if necessary, external functions 240 defined in the external function space 24. Each object generated by the script executer 204 also has a header including object identifying information.

The object reception unit 202 reads out a bit stream object from the buffer area 201A in accordance with the picture frame period, and supplies it to the pattern comparator 203. When a new object has been stored in the buffer area 201B, the object reception unit 202 supplies the object read out from the buffer area 201B and the cursor coordinate values read out of the buffer area 201C to the pattern comparator 203.

The pattern comparator 203 also evaluates the object read out from the buffer area 201B, as it does for a bit stream object, according to pattern formulas stated in the pattern definition list 230, and instructs the script executer 204 to process each object in accordance with an execution script corresponding to the pattern formula matched with the object. This object is also stored into the media object space 25.

Objects instructed in execution scripts to be outputted to the display unit 13 are outputted from the pattern comparator 203 to the display unit. Therefore, by designating in a pattern formula in advance as objects to be outputted to the display unit, for instance, a picture object converted from a bit stream object through decoding processing and objects of specific attributes generated through picture processing by the object processing unit, it is able to output an image in a state such that the picture object and objects of specific attributes are superposed to the display unit 13.

The object processing unit 22 according to the invention is characterized in that, after executing (A1) the reading of an object supplied from outside, (B1) the specification of an execution script by the matching of object identifying information with pattern formulas and (C1) object processing according to the specified execution script as described above, (A2) the reading of a new object generated by object processing, (B2) the specification of an execution script by the matching of object identifying information with pattern formulas and (C2) object processing according to the specified execution script are recursively repeated.

Thus, the media recognition system according to the invention is characterized in that a series of data flow type media processing accomplished by the conventional media recognition application is realizes by the repetition of recursive processing including the execution of a script corresponding to an input object and re-inputting of an internally generated object.

Next, the operation of the object processing unit 22 in the image recognition application 20 will be described with reference to FIGS. 3A and 3B.

In the pattern definition list 230 shown in FIG. 3A, a plurality of pattern action sections 301 through 307, each representing the correspondence of a pattern formula with an execution script, are stated in the following syntactic forms.

```
{
    Pattern action section
    Pattern action section
    :
    Pattern action section
}
```

In each pattern action section, the correspondence of the pattern formula with the execution script is stated in the following syntactic form.

```
/Pattern formula/Script section
```

In this embodiment, the object to undergo pattern evaluation is represented by a variable name of "$0" in the pattern formula. In each script section, the execution script is stated in the following syntactic form in a C language type script language, such as JavaScript (the attribute name of ECMA Script according to the ECMA Standard) for instance.

```
onInsert {execution script}
onDelete {execution script}
always {execution script}
```

The script executer 204 interprets and executes execution scripts in this JavaScript form. Therefore, the interpreting/executing module for JavaScript realized in Web browsers and elsewhere can be applied to the script executer 204 of this embodiment.

In FIG. 3B, blocks 25(0) through 25(6) presented under the time axis show examples of contents of the media object space 25 at points of time T0 through T6 ticked within the picture frame period of TV images. The operation of the object processing unit 22 will be described along the time axis.

The object reception unit 202 reads out a bit stream object 322 from the buffer area 201A at point of time 0, and supplies it to the pattern comparator 203. The bit stream object 322 is added to the media object space 25(0). Reference numeral 321 denotes a mouse coordinate object which will be described later in detail. For the supply of the bit stream object 322 from the object reception unit 202 to the pattern comparator 203, notification of the address of the buffer area 201A may be substituted for a transfer of real data.

Upon inputting the bit stream object 322, the pattern comparator 203 matches object identifying information indicated in the header of the bit stream object with the pattern formulas indicated by the pattern action sections 301 through 307 in the pattern definition list 230, and searches for a pattern action section corresponding to the attributes (type) of the input object. Here, description will be made in the case where object identifying information is evaluated according to pattern formulas in order of arrangement of the pattern action sections (301, 302, . . . 307).

First, the object identifying information is evaluated according to the pattern formula "/$0.class ==bit stream/" of the pattern action section 301. "$0" is a variable name given to the input object, and "$0.class" signifies the class name of the input object. The class in this context means both of the class in an object-oriented programming language such as the Java language and the class used in the object concept, while the "class name" is an identifying name unique to each class.

Figure 4:
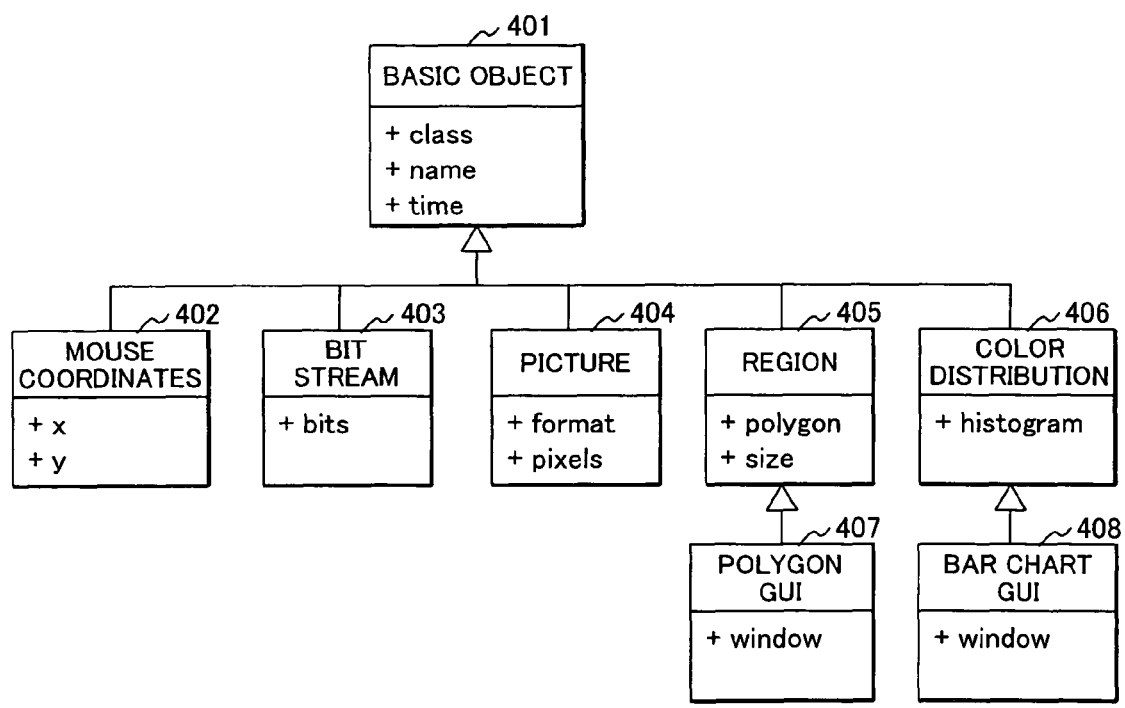
FIG. 4 is a diagram showing the relationships of class succession of media objects to be handled by the embodiment of the invention.

The classes of input objects handled by the object reception unit 202 of this embodiment will be briefly described with reference to FIG. 4. FIG. 4 shows the relationships of class succession of objects written in an object-oriented standard model graphic expression known as Unified Modeling Language (UML). All the input objects in this embodiment belong to a class called basic object 401. The basic object class 401 has, as its attributes, a class name "class", an object name "name" and an object display point of time "time".

Attribute classes 402 through 408 represent the types of input objects supplied to the object reception unit. These classes succeed the attributes of the basic object class 401.

A mouse class 402 has an attribute (x, y) indicating X and Y coordinates. A bit stream class 403 has a "bits" attribute indicating the arrangement of bits. A picture class 404 has a "format" attribute indicating the type of picture and "pixels" indicating the arrangement of pixels. A region class 405 has a "polygon" attribute indicating the arrangement of apex coordinates of a polygonal shape. The "polygon" attribute has data type values representing a polygon.

Also, as a function associated with the data type, there is prepared a size ( ) function for calculating the area of a polygonal region. A color distribution class 406 has a "histogram" attribute representing a frequency distribution table based on color classification.

A polygon GUI class 407, succeeding the attribute of the region class 405, has a "window" attribute indicating a window for displaying and operating a GUI. A bar chart GUI class 408, succeeding the attribute of the color distribution class, has a "window" attribute indicating a window for displaying and operating a GUI. The "class" attributes of these classes are given, as constants, the class names of the respective classes indicated in UML of FIG. 4.

Referring back to FIGS. 3A and 3B, the bit stream object 322, which is the first input object, is judged true as a result of evaluation according to the pattern formula "/$0.class ==bit stream /" of the pattern action section 301. Therefore, the bit stream object 322 is processed in accordance with the execution script indicated by the pattern action section 301 in the script executer 204. In the illustrated case, the execution script of the pattern action section 301 is "onInsert {insert (picture decode ($0))}".

Here, "onInsert" means that the execution script "insert (picture decode ($0))" defined in this pattern action section should be immediately executed on the input object. The execution script "insert (picture decode ($0))" means that the input object (the bit pattern steam object at this time) designated by the variable $0 of the pattern formula should be processed by applying the "picture decode" function prepared in the external functions 240. The "insert" function, which is a basic function offered by the object processing unit 22 of this embodiment, instructs to input an object designated with a parameter to the object reception unit 202.

In this embodiment, the picture decoding function is an MPEG decoding module for converting a bit stream object supplied as MPEG encoded data into a picture frame. Therefore, when the script executer 204 executes "insert (picture decode ($0))", the bit stream object 322 supplied as the input object is converted into a picture frame, outputted as a picture object 323 with another attribute and stored in the buffer area 201B.

Although the bit stream object 322 is also matched with the pattern formulas of the other pattern action sections 302 through 307 stated in the pattern definition list, the result of evaluation is false in each case and execution scripts defined by these pattern action sections are not applied to the bit stream object 322.

The picture object 323 is read into the object reception unit 202 at the point of time T1, and supplied to the pattern comparator 203. Then, the media object space 25(1) changes into a state in which the picture object 323 is added. The pattern comparator 203 matches the identifying information of the picture object indicated in the header of the input object with the pattern formulas indicated by the pattern action sections 301 through 307 in the pattern definition list 230, and searches for a pattern action section corresponding to the input object.

Figure 8:
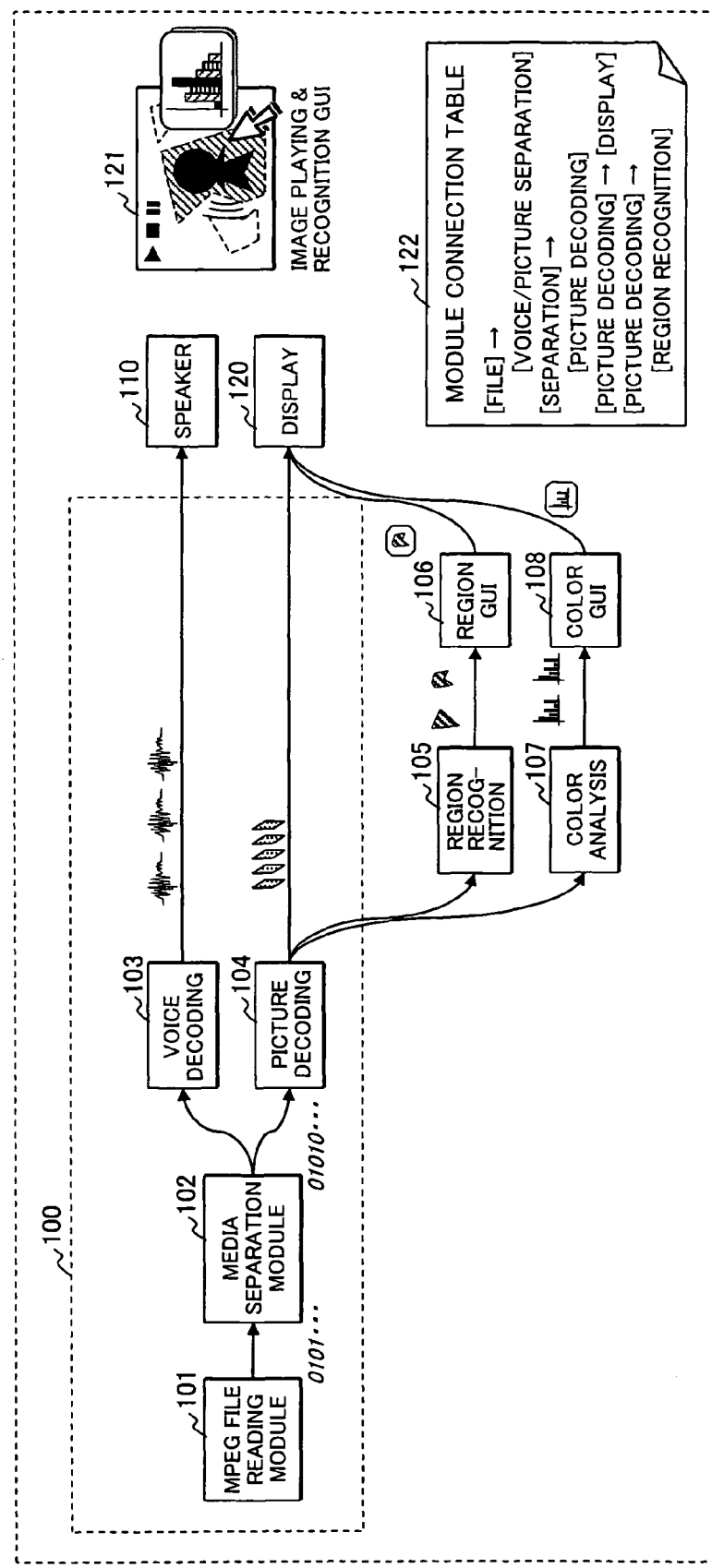
FIG. 8 illustrates the structure of a conventional media recognition application.

This time, as the result of evaluation according to the pattern formula of the pattern action section 302 is true, the script executer 204 executes the execution script "insert (region extraction($0))" defined by the pattern action section 302 on the picture object 323. The expression "region extraction ($0))" means that a function corresponding to the region recognition module 105, described with reference to FIG. 8, is called out of the external functions 240 and the picture object 323 is processed by applying this function. In this case, a region object 324 is generated from the script executer 204 as a result of processing of the picture object 323 and outputted to the buffer area 201B.

The region object 324 is inputted to the object reception unit 202 at the point of time T2 and supplied to the pattern comparator 203. Then, the media object space 25(2) changes into a state in which the region object 324 is added. The pattern comparator 203 matches the identifying information of the region object indicated in the header of the input object with the pattern formulas indicated by the pattern action sections 301 through 307 in the pattern definition list 230 and searches for a pattern action section corresponding to the input object.

With a region object, a polygon attribute representing the shape (polygon) of the region and a size attribute representing the area of the polygonal region are associated. This time, the result of evaluation according to the pattern formula of the pattern action section 303 is true, and the script executer 204 executes on the region object 324 the execution script "insert (polygon GUI($0))" defined by the pattern action section 303. As a result, a polygon GUI object 325 for displaying the boundary of the region on the screen is generated from the region object 324 and outputted to the buffer area 201B.

Incidentally, "region &&$0. size>30%" stated on the right side of the pattern formula of the pattern action section 303 means a region object whose polygon size (the area of the region) is greater than 30% of the display screen, and this time the region object 324 is supposed to satisfy the above-stated condition. The polygon GUI object 325 is inputted to the object reception unit 202 at the point of time T3, and supplied to the pattern comparator 203. Then, the media object space 25(3) changes into a state in which the polygon GUI object 325 is added.

By supplying in this way the objects generated by the script executer 204 to the pattern comparator 203 via the object reception unit 202, new objects are added to the media object space one after another, and their contents vary as indicated by 25(4) through 25(5). The pattern action sections 305 through 307 relate to display screen manipulation by the user, and their details will be described later.

In this embodiment, some of pattern action sections are applied also to the output control of object to the display (the display unit 13). In the pattern definition list 230, the pattern action section 305 states which input object should be displayed on the display screen.

As evident from the contents of the pattern formula, the result of evaluation according to the pattern formula of the pattern action section 305 becomes true when the input object is a picture, a polygon GUI or a bar chart GUI. Then, "always {display($0)}" defined in the script section is executed. Here, the "always" means that the execution script stated in the following parentheses is periodically executed as long as the object matched with the pattern formula is stored in the media object space 25.

In the case of the pattern action section 305, as the execution script is "{display($0)}", the picture objects, the polygon GUI objects and the bar chart GUI objects stored in the media object space 25 are displayed continuously on the display screen until they are deleted from the media object space 25 under time control which will be described later.

In order to realize matching of all the objects stored in the media object space 25 with the pattern formulas of the pattern action section including the "always" mentioned above, the pattern comparator 203 may be provided with, besides the standard function to match input objects from the object reception unit 202 with all the pattern formulas, an endless loop type special display object control function, which repeats matching between the pattern action section 305 and the media object space 25 in a predetermined cycle and outputs objects matched with the pattern formulas on the display screen. This display object control function may be prepared in the object processing unit 22 as a module independent of the pattern comparator 203.

If the number of objects stored in the media object space 25 becomes great, for instance, it increases time sequentially or beyond a predetermined number, the processing load of the processor 10 will become heavier correspondingly. Therefore, the objects to be matched with pattern formulas may be limited to, for instance, only those whose internal values varied over the last few milliseconds.

Regarding variations in internal values of objects, for instance, a function for changing the internal values of objects, which will be referred to as onUpdate function in this embodiment, may be prepared as a function common to all the input objects, so that a flag (called the dirty flag) for indicating change of an internal value in any object newly added to the media object space 25 is turned on by this "onUpdate" function. An "always" type constant evaluation may be accomplished by, for instance, matching the media object space 25 with the pattern action section 305 as soon as the "onUpdate" function is called, besides the above-described endless loop method.

The display control using the media object space 25 and the pattern formulas has an advantage such that plural kinds of objects differing in attribute and being stored in the media object space 25 can be simultaneously displayed on the screen. The conventional image recognition application described with reference to FIG. 8 can display media data and the characteristic quantities of media only as many as the numbers of modules branched out of the MPEG picture decoding module 104 by wiring (105 and 107 in FIG. 8). According to the image recognition application of this embodiment, sophisticated screen displaying is enabled with respect to a plurality of types of objects defined by the pattern action sections, taking into consideration the mutual relationships among the objects.

Next, the relationships between mouse manipulation the user performs on the display screen and the media recognition processing will be described.

Since the pattern action section 306 includes the pattern formula having designated the polygon GUI object and the "always" action section, the execution script stated on lines 306a through 306d are executed when the input object is a polygon GUI object or a polygon GUI object is stored in the media object space 25.

On the line 306a, "$p=$0" means to shift the object variable $0 (the polygon GUI 325 here) into variable $p (memory region) "$m=select1 (/pattern formula/)" means to select an object corresponding to the pattern formula (the mouse coordinate object 321 in the example shown here) from the media object space 25, and set it to variable $m.

A built-in function "select1 (/pattern formula/)" is configured so as to select the first object, on which the result of evaluation according to the pattern formula becomes true, out of all the objects in the media object space and send it as the reply to the requester module. However, the function "select1 (/pattern formula/)" may be configured so that a set of all the objects matched with the pattern formula are sent as the reply. By using the Select ( ) function, many and diverse objects can be readily handled, which is difficult for the module-connected type conventional application.

The function of "overlap judgment ($m, $p)" stated on the line 306b is one of the external functions 240. In the example cited here, as apparent from the contents of the statement on the line 306a, the parameters $m and $p represent a polygon GUI and mouse coordinates, respectively. The function of "overlap judgment ($m, $p)" is a function to give a reply of truth as the result of judgment when the mouse is in a position overlapping the polygon GUI on the display screen. When the result of judgment indicates truth, actions stated on the lines 306c and 306d are executed.

First, the picture object 323 at the present time (the point of time T0 in FIG. 3) is selected by the select1 ( ) function stated on the line 306c, and stored into a variable $v. Next, an external function "color analysis ( )" for analyzing color is called in accordance with a statement "insert (color analysis ($p, $v))" on the line 306d, and color analysis is performed within the region occupied by the polygon GUI object 325 indicated by the variable $p in the picture object 323 indicated by the variable $v. The result of this color analysis is outputted as a color distribution object 326, and supplied to the pattern comparator 203 via the buffer area 201B and the object reception unit 202.

Supposing here that the polygon GUI object 325 is outputted to the display screen at the point of time T3 and the icon is overlapped on it, for instance, within a predetermined length of time, the color distribution object 326 will be stored in the media object space 25(4) at the next point of time T4.

When the color distribution object 326 is supplied to the pattern comparator 203, the result of evaluation according to the pattern formula in the pattern action section 304 becomes true. In this case, the script executer 204 executes a script "insert (bar chart GUI ($0))" defined in the pattern action section 304 to generate a bar chart GUI object 327, and outputs it to the buffer area 201B.

The bar chart GUI object 327 is supplied to the pattern comparator 203 at the point of time T5 and stored in the media object space 25(5). As the result of evaluation according to the pattern formula of the pattern action section 305 then becomes true, a bar chart GUI object is displayed on the screen.

The final pattern action section 307 in the pattern definition list 230 is prepared to delete from the media object space 25 any object satisfying the conditions for deletion.

Each of the objects stored in the media object space 25 has a time attribute as described with reference to FIG. 4. In the bit stream object 322, time information (time stamp) at the point of time when outputted from the MPEG file reading module 21 is set as the time attribute. The time information (time stamp) of the bit stream object 322 can be read out in accordance with, for instance, the reading method for multiplexed time stamps defined in the ISO MPEG Standard.

Treating one bit stream object 322 as a starting point, various types of objects subsequently generated with different attribute (picture objects, region objects, polygon objects and so forth) succeed the time attribute of the source object which is handed down as a parameter. Therefore, the objects 323 through 327 shown in the media object spaces 25(0) through 25(5) of FIG. 3 have the same time information (time stamp) as the bit stream object 322.

The pattern action section 307 is an "always" type execution script to be periodically executed. According to the execution script of the pattern action section 307, when the present time exceeds the sum (time limit) of the point of time indicated by the time attribute of the object and the life time designated by a variable $t, a delete function is executed. The delete function is a built-in function for deleting an object indicated by the variable $0 from the media object space 25. For instance, in the case where the time attribute of the bit stream object 322 is "Tx" and the life time is $\Delta t$, the bit stream object 322 and all the objects deriving from it are deleted from the media object space 25 when the present time has exceeded "Tx+$\Delta t$".

Figure 5:
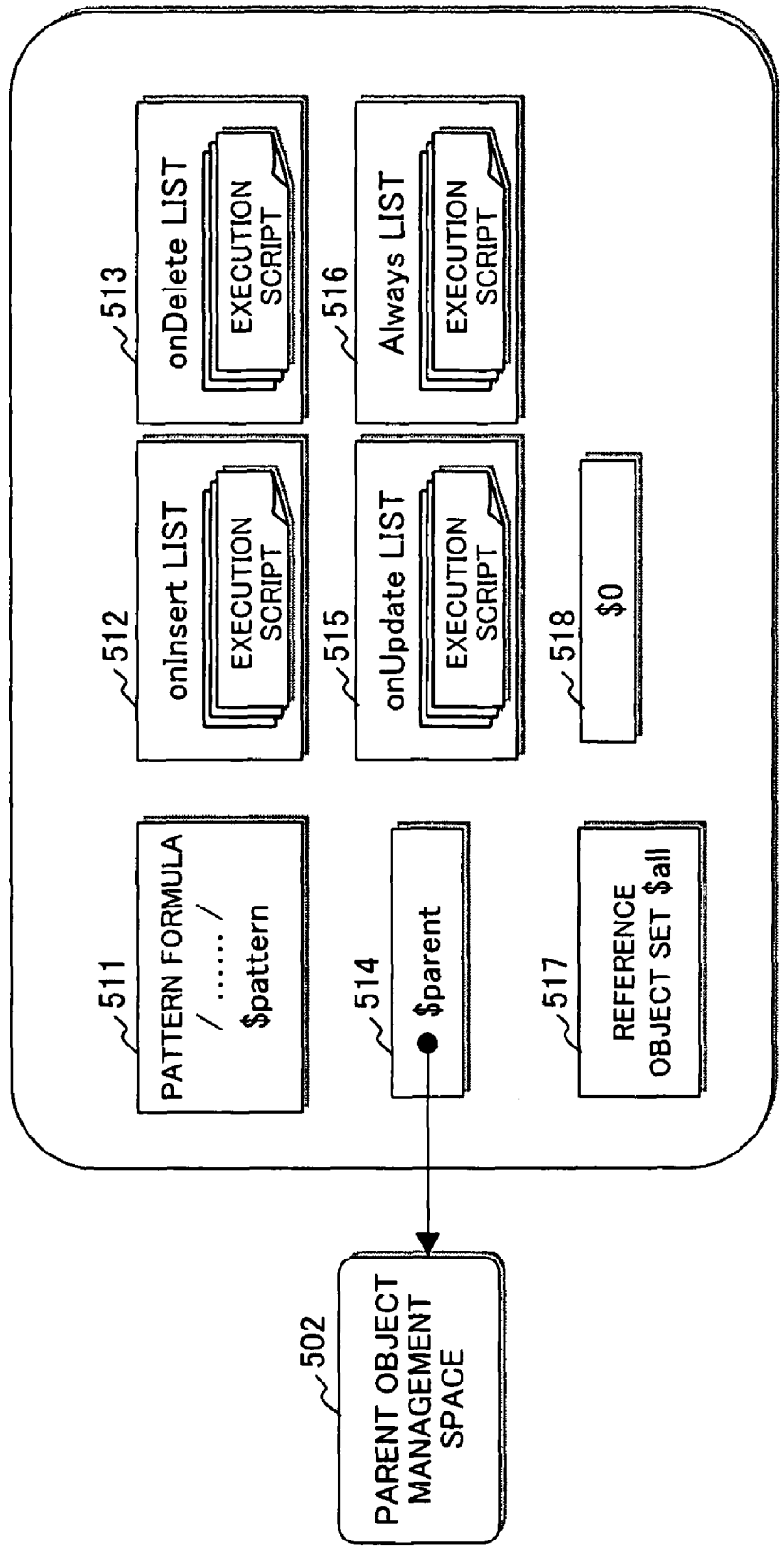
FIG. 5 shows an example of contents of an object management space 23.

FIG. 5 shows the contents of the object management space 23. In the object management space 23, the following object-oriented type elements are mounted. Object-oriented type elements mounted on the object management space 23 include a pattern formula object 511 (attribute name: $pattern) for processing the pattern formula of each pattern action section stated in the pattern list 23, a parameter 514 (attribute name: $parent) indicating a parent object management space 502 to be referred to by the pattern formula; a reference object set 517 (attribute name: $all) in which the reference pointers for the objects having succeeded in matching with the pattern formula are stored, a variable ($0) 518 indicating the temporary storage destination of the object currently being matched for use in matching with the pattern formula, and leading address lists of functions defined by the execution scripts associated with the pattern formula. In the example shown here, the leading address lists include an onInsert list 512, an onDelete list 513, an onUpdate list 515 and an always list 516.

In the object management space 23, these elements, except the reference object set 517, are stored as the result of analysis of the pattern definition list 230 by syntactic analysis processing which will be described next.

FIG. 5 shows the structure of the object management space in the case where pattern formulas are hierarchized into a parent pattern formula and child pattern formulas in the pattern definition list 230, as will be described later. The part shown as the object management space 23 is for the child pattern formula group. In the parent object management space 502, elements 511 through 518 ($parent 514 is unnecessary) are stored correspondingly to the parent pattern formula group. When the pattern formulas are comprised of only parent pattern formulas, the object management space will have a structure omitting $parent 514 and the parent object management space 502 from FIG. 5.

Figure 6:
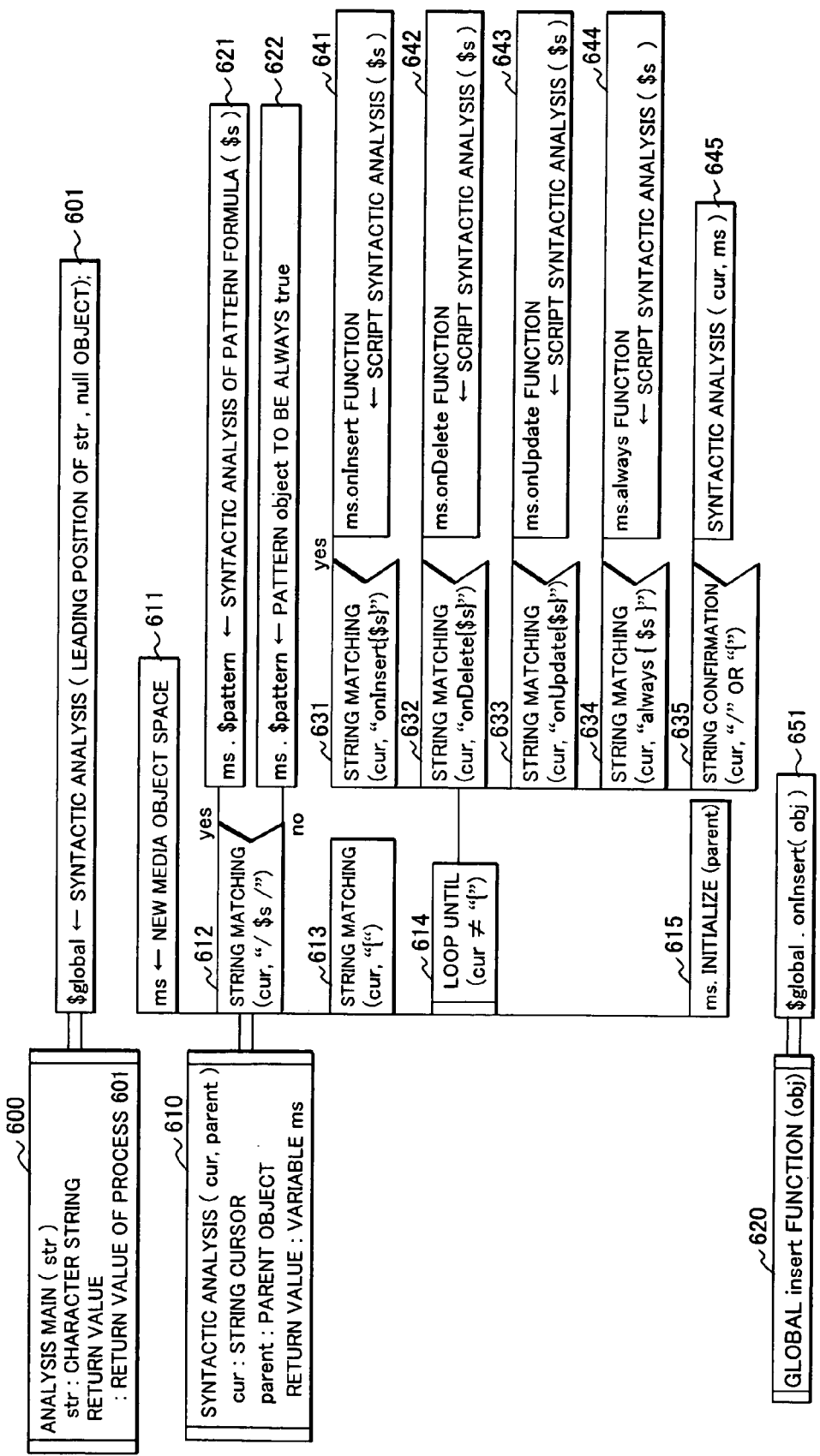
FIG. 6 is a structural flowchart showing an embodiment of syntactic analysis processing of the pattern definition list.

FIG. 6 is a structural flowchart showing syntactic analysis processing of the pattern definition list to be executed first by the pattern comparator 203. The pattern definition list 230 to be analyzed in this embodiment is hierarchically stated as follows.

```
/parent pattern formula/ {
    onInsert {execution script}
    onDelete {execution script}
    onUpdate {execution script}
```

-continued

```
        always {execution script}
        /child pattern formula 1/{
            onInsert {...}
            onDelete {...}
            onUpdate {...}
            always {...}
            /grandchild pattern formula 1/ {...}
            /grandchild pattern formula 2/ {...}
        }
        /child pattern formula 2/ {...}
        :
}
```

Here, the "/pattern formula/" part can be omitted from the list. If it is omitted, the pattern definition list will be interpreted to include a pattern formula that always makes the result of evaluation "true" for any arbitrary object. The onInsert section, onDelete section, onUpdate section and always section may be also omitted, and order of description of sections in the pattern definition list, including /pattern formula/, can be chosen as desired. Therefore, the statement of the outermost { . . . } in the pattern definition list 230 shown in FIG. 3 is equivalent to "/true/{ . . . }."

Analysis processing of the pattern definition list shown in FIG. 6 comprises an analysis main function 600, a syntactic analysis module 610 to be executed recursively and a global insert function 620.

First, the analysis main function 600 is executed. The whole character string ("str") stated in the pattern definition list 230 is handed over to the analysis main function. The analysis main function 600 designates a null object and the leading position of the character string "str" with parameters, and calls the syntactic analysis module 610 (601). At this time, the leading position of the character string "str" is designated with a character string cursor cur, and the parent media object space is designated with "parent".

The role of the syntactic analysis module 610 is to referrer to the pattern definition list 230 from the position designated with cur, search the media object space for an object name corresponding to the pattern formula and set the result into "$global" representing the global variable.

The syntactic analysis module first allocates a new media object space to the return variable "ms" of the function (611). The new media object space is a set whose attribute value is null or void, and processing is supposed to be ended without calling a function. Next, in order to specify the pattern formula stated in the pattern definition list 230, the syntactic analysis module scans the character string from the cursor position "cur", skipping blanks and searches for a "/ . . . /" pattern (612).

If the "/ . . . /" pattern is detected, the character string part included between the two slants (/), before and behind, is substituted into a variable "$s". Then, the cursor position "cur" has moved to a position next to the behind slant. Next, the syntactic analysis module syntactically analyzes the pattern formula, and substitutes the result into its own pattern formula object "$pattern" (621). For the syntactic analysis of the pattern formula, syntactic analytical processing regarding numerical formulas can be used out of the compiler of JavaScript. The result of syntactic analysis of a script will be an object including an executable intermediate instruction code.

In this embodiment, for the sake of simplifying the description, if it is failed to detect the "/ . . . /" pattern at the character string matching 612, the syntactic analysis module will judge that no pattern formula is present in the pattern definition list 230, and set a pattern formula object which makes the result of evaluation always true in the pattern formula $pattern (622).

Next, in order to analyze the script section "{ . . . }" associated with the pattern formula, the syntactic analysis module skips characters from the cursor position "cur" until an opening brace "{" is detected (613) and, upon detecting the opening brace, executes loop processing 614 for syntactically analyzing the character string between the braces. In the loop processing 614, the syntactic analysis module repeats the syntactic analysis of minor elements including onInsert, onDelete, onUpdate, always and /child pattern formula/ { . . . } until a closing brace "}" forming a pair with the opening brace "{" appears.

In the loop processing 614, first, the syntactic analysis module performs character matching for detecting a character string in an "onInsert { . . . }" form next of the cursor position "cur" and, if the matching ends successfully, substitutes the execution script part in the braces { . . . } into $s (631). After that, the syntactic analysis module hands over the execution script part in $s to the syntactic analytical processing for an instruction sentence in the JavaScript compiler, and sets the intermediate instruction code obtained as the result of syntactic analysis to the initial value of the onInsert list 512 (see FIG. 5) of its own object "ms" currently in the initialized state (641).

If matching ends unsuccessfully in the processing 631, the syntactic analysis module performs character matching for detecting a character string in an "onDelete t { . . . }" form next of the cursor position cur and, if the matching ends successfully, substitutes the execution script part in the braces { . . . } into $s (632), hands over the execution script part in $s to the syntactic analytical processing, and sets the result of syntactic analysis as the initial value to the onDelete list 513 of its own object (ms).

In the same way as described above, the syntactic analysis module performs character matching for detecting a character string in an "onUpdate { . . . }" form (633). If the matching ends successfully, the syntactic analysis module sets the result of syntactic analysis of the execution script part by the syntactic analysis processing as the initial value to the onUpdate list 515 of its own object (ms) (643).

Next, the syntactic analysis module performs character matching for detecting a character string in an "always { . . . }" form (634) and, if the matching ends successfully, sets the result of syntactic analysis of the execution script part by the syntactic analysis processing as the initial value to the always list 516 of its own object (ms) (644).

If the character in the cursor position is a slant "/" or an opening brace "{", there is possibility that a child pattern formula is stated after that. Therefore, when the processing from 631 through 634 ends successfully, the syntactic analysis module checks whether the character in the cursor position is "/" or "{" (635) and, if "/" or "{" is detected, recursively calls syntactic analytical processing 610 (645).

In the processing 635, the syntactic analysis module performs character confirmation of "/" or "{" without moving the character cursor position "cur." For calling the syntactic analysis processing 610 recursively in processing 645, the syntactic analysis module designates with parameters the present cursor position "cur" and the parent object or its own object "ms" currently being processed.

In the loop 614, processing to detect the aforementioned character strings onInsert, onDelete, onUpdate, always and child pattern formulas is repeated until the closing brace "}" forming a pair with the opening brace "{" appears. When the closing brace "}" appears, the syntactic analysis module calls the function to initialize the media object space 25 based on the information so far read in (615).

The global insert function 620 keeps on calling the subsequent pattern matching processing by calling an onInsert ( ) function to the top level media object space "$root" which was set by the analysis main function 600 as will be described later. The insert function having described with reference to the pattern definition list 230 of FIG. 3 is realized through the global insert function 620.

In this embodiment, by applying the global insert function 620 to all the objects generated by the object processing unit 22, functions equivalent to those of the object reception unit 202 described with reference to FIG. 2 can be provided.

Figure 7:
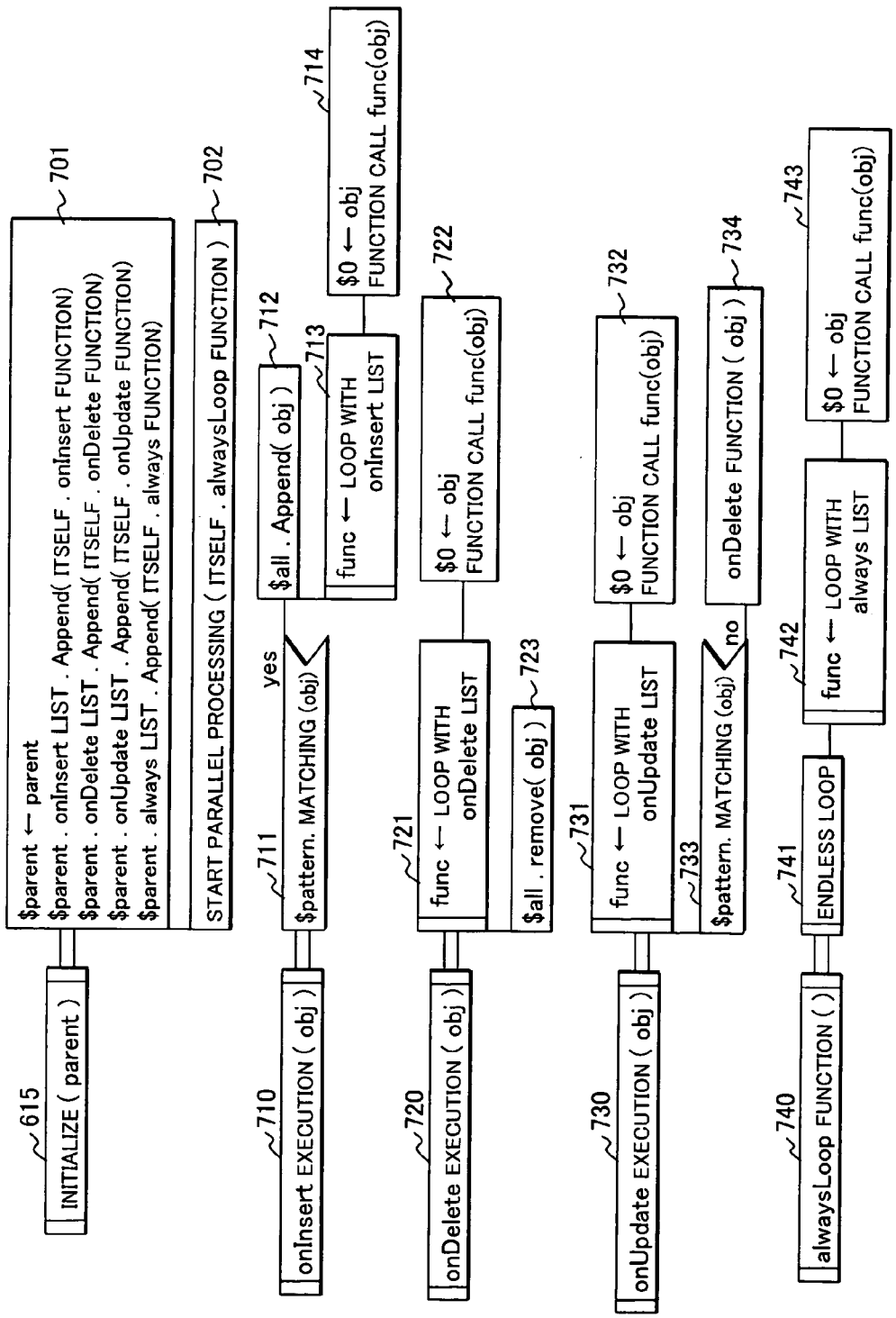
FIG. 7 is a structural flowchart showing an embodiment of function processing in the object management space 23.

FIG. 7 is a structural flowchart for processing the functions stored in the object management space 23. These functions are mounted as methods of an object-oriented language, such as Java.

The initializing function 615 receives a parameter "parent" indicating the parent object management space and performs a series of initialization processing (701). The initialization processing 701 sets an object designated with parameter as its own $parent attribute, and adds the leading addresses of onInsert function, onDelete function and onUpdate function for itself to the onInsert list, onDelete list and onUpdate list which belong to the parent object. This initialization causes automatic transfer of event from the parent object management space to the child or grandchild object management spaces when any object is added, deleted or updated in the parent object management space.

Upon completion of the initialization processing 701, the object management space enters into a state of script execution. More specifically, its own alwaysLoop ( ) function is actuated as parallel processing (702) so that the execution script written in the always section can be periodically executed.

Reference numeral 710 denotes an onInsert execution (obj) function, which is called immediately before a new object is added to its own media object space. The parameter obj set in the parentheses of the function 710 represents the object about to be added.

The function 710 first performs pattern matching processing of "obj" by using its own pattern formula object "$pattern" (711). Since "$pattern" is an executable intermediate instruction code such as JavaScript in this embodiment, any script stated in the pattern definition list 230 can be executed by handing over this intermediate instruction code to the pattern comparator 203 and the script executer 204 of FIG. 2.

In this case, execution control of "$pattern" and referring to the related objects such as $0 are performed by the pattern comparator 203, while the execution of a series of instructions defined by execution scripts is performed by the script executer 204. The script executer 204 calls, if necessary, any function from among the external functions 240 prepared in the external function space 24.

When pattern matching of the object "obj" with "$pattern" ends successfully, the processing 711 adds this object to its own reference object set 517 having attribute name $all (712), thereby to inform inferior (child) object spaces of the addition of a new object.

More specifically, the newly added object "obj" is designated with a parameter by loop processing (713) for selecting all the onInsert functions registered in the onInsert list 512 one after another, whereby each function is called (714). In this process, the object to be processed now is substituted into $0 in advance so that the called function can refer to the object (714). Incidentally, since an intermediate instruction code such as JavaScript is recorded at the destination address of each of the functions registered in the onInsert list 512, the script executer 204 is utilized for the execution of the called function, if necessary.

Reference numeral 720 denotes an onDelete execution (obj) function which is called to delete any object from the media space. The parameter "obj" designates the object to be deleted.

When the function 720 is called, loop processing (721) for successively selecting all the functions registered in an onDelete list 721 calls the execution scripts of the selected functions (722). Each of the functions registered in the onDelete list 721 is called, as in the case of onInsert execution, in a state where the object "obj" to be deleted is substituted into $0 in advance. Finally, the object designated with the parameter obj is deleted from its own reference object set "$all" 517.

In object deletion, no evaluation according to a pattern formula is necessary, but a superior object is required to notify an inferior object of the media object deletion.

Reference numeral 730 denotes an onUpdate execution (obj) function which is called when any object in the media object space is updated. The parameter "obj" designates the updated object. The object designated by the parameter "obj" has an updated object value, updated by the calling side already. In order to notify the inferior object of the updating of the media object, the function 730 calls each function (732) by loop processing (731) for selecting all the functions registered in the onUpdate list 515. Then, each function is called in a state where the updated object "obj" is substituted into $0 in advance.

Updating of the object may result in failure to satisfy the conditions of the pattern formula "$pattern." Accordingly, the updated object is matched again with "$pattern" (733) upon completion of the loop processing (731). If the updated object fails in matching with the pattern formula, its own onDelete function is called to delete the object from its own media object space (734).

If matching with the pattern formula ends successfully, there is nothing more to be done, because only the reference to objects needs to be controlled in the media object space and the value of each updated object is irrelevant. Therefore, no change occurs in the contents of the reference object set $all.

Reference numeral 740 denotes an alwaysLoop function (xxx) executed by the OS as a parallel process or a parallel thread. The function 740 repeats loop processing (742) for successively selecting all the functions registered in the always list 516 by an endless loop function 741 to repeat execution of execution scripts of the always section as long as the media object space exists. Accordingly, each of the functions registered in the always list 516 is executed in predetermined cycles (743).

Figure 3:
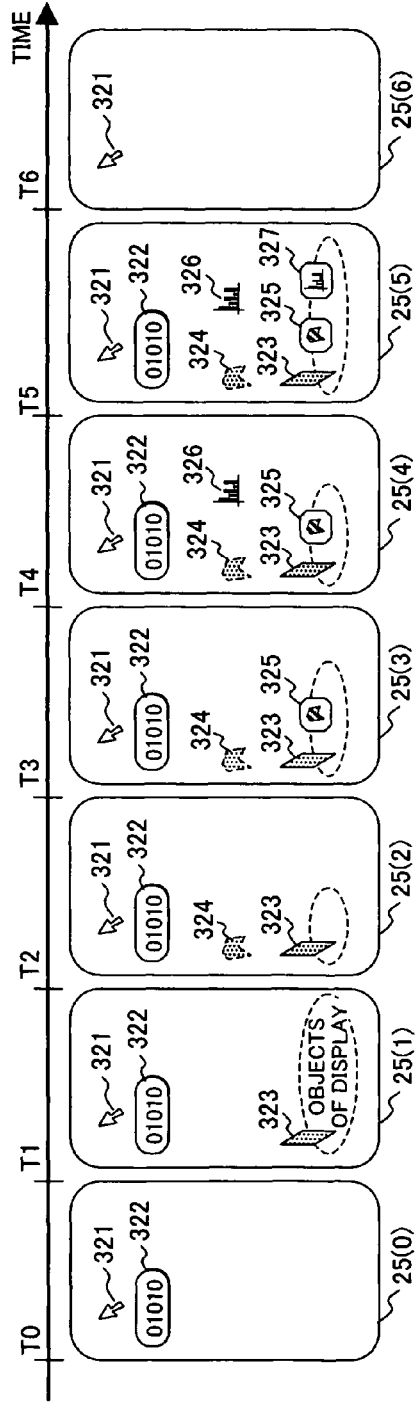
FIG. 3A shows an embodiment of pattern definition list 230.
FIG. 3B shows a time sequence diagram of the contents of a media object space 25.

The pattern definition list 230 shown in FIG. 3 is intended, when MPEG-encoded picture data (bit stream object) are inputted, to decode them for conversion into a picture frame (picture object)

(301), extract a specific region from the picture frame (302), generate a frame shape surrounding this extracted region (polygon GUI), output it to the display screen (303 and 305) and, when the user clicks a region in the frame by mouse manipulation, perform color analysis of the region in the frame (306, 306*a* through 306*d*) to generate a bar chart of color distribution indicating the result of analysis for displaying on the screen (304 and 305).

According to the invention, by altering an action statement defined by the pattern definition list 230, for instance, the region of a person (face) shown on the display screen can be extracted, thereby to recognize the person in the region selected by the user by mouse clicking. It is also possible to acquire various items of information related to the person by accessing a database by utilizing the result of recognition.

In order to extract the region including the person's face from the video screen, for instance, a face region extracting function for finding the face of a person in a picture frame (picture object) and extracting that region is applied to an execution script in the action statement (pattern action section) 302 in the pattern definition list of FIG. 3. The face region of the person can be extracted by applying, for instance, the face recognition technique of the Visual part in the MPEG-7 Standard and by matching with a spring type face model.

When a face region object generated by executing the face region extraction function is inputted, it is possible to generate a frame shape surrounding the region (polygon GUI) by the action statement 303 and to output it to the display screen by the action statement 305.

In this case, the action statements 306a through 306d linked to the user's mouse manipulation are altered so as to execute a face characteristics extracting function for identification of the person when an in-frame region (face region) is clicked. Further, a new action statement is prepared to perform functions of specifying, when a face characteristic quantity object generated by the execution of the face characteristics extracting function is inputted, person identifying information from the face characteristic quantity and search a database for relevant information by utilizing this person identifying information.

For data processing to identify a person from a face characteristic quantity and acquire relevant information, a server on the Internet connectable through the line interface 14 can be utilized. In this case, an external function for transmitting the face characteristic quantity to a pre-designated server and acquiring relevant information (HTML information) from the server is stated in the execution script of the action statement for specifying person identifying information from the face characteristic quantity. In order to output the relevant information (HTML information) on the person to the display screen, the HTML information may be added to the action section 305 of the pattern definition list.

Incidentally, since communication between a user terminal and a server on the Internet is accomplished by a communication software different from the image recognition application, the external function then executed is a function for starting the communication software to transmit the face characteristic quantity to the server and for inputting when relevant information is received from the server, the information to the object reception unit as a new object. In the case where the face recognition server is independent of the information server for providing the relevant information, an external function for accessing to the information server based on the person identifying information obtained from the face recognition server can be applied to the execution script.

As evident from the embodiment described above, the image recognition system according to the present invention makes possible recursive recognition processing of media objects by adopting a pattern definition list comprising a plurality of pattern action sections in which pattern formulas and execution scripts are defined in association with identifying information of media objects (media types). Although the embodiment of the invention was described with reference to a case where input media are images, recognition processing of audio media can also be realized by a method similar to that for visual media. According to the invention, since the operation of application to be executed can be succinctly stated for each attribute of an object designated by a pattern formula, a media recognition system adaptable flexibly to various media data and media characteristic quantities which may emerge at random can be provided.

What is claimed is:

1. A media recognition system including a processor, a memory, a display unit having a display screen, and an input device, and executing predetermined recognition processing on a supplied media object to output the result of processing to said display screen, comprising:
   an object management space defined in said memory;
   an object processing module for processing said media object in accordance with a pattern definition list stored in said object management space; and
   a media object space defined in said memory for storing new media objects generated by said object processing module,
   wherein said pattern definition list includes a plurality of action statements each defining a script program to be executed, in association with a pattern formula designating attributes of each media object,
   said object processing module selects a script program corresponding to said media object based on a pattern formula indicated by said pattern definition list and executes media processing in accordance with the script program, thereby to generate a new media object having different attributes, repeats recursive media processing on the generated media objects as new input media objects in accordance with said pattern definition list, and selectively outputs a media object having an attribute pre-designated in said pattern definition list to said media object space and said display unit,
   wherein said object processing module includes:
   an object reception unit for reading in said consecutively supplied media objects and said newly generated media objects in order of generation;
   a pattern matching unit for receiving a media object from said object reception unit, matching media identifying information attached to the media object with a pattern formula indicated by said pattern definition list, and selecting a script program to be executed; and
   a script executer for executing a script program,
   wherein said script executer executes the script program selected by said pattern matching unit, and supplies a generated media object to said object reception unit as a new input media object.

2. The media recognition system according to claim 1, wherein said pattern matching unit stores media objects generated by said script executer into said media object space, and outputs a media object having specific attributes pre-designated by said pattern definition list to said display screen.

3. The media recognition system according to claim 2, wherein said pattern definition list includes action statements for outputting a plurality of media objects having different attributes designated by pattern formulas to said display screen, and said pattern comparator outputs a media object having specific attributes and stored in said media object space to said display unit in accordance with the action statements.

4. The media recognition system according to claim 1, wherein said pattern definition list includes action statements defining a script program to be executed in the form of designating the timing of inputting to said object reception unit, in association with a pattern formula designating a newly generated media object.

5. The media recognition system according to claim 1,
wherein said pattern definition list includes action statements defining a script program to be periodically executed, in association with a pattern formula designating a media object having specific attributes and stored in said media object space.

6. The media recognition system according to claim 5,
wherein each of the media objects stored in said media object space includes time information, and
said pattern definition list includes action statements for deleting media objects stored in said media object space according to the pertinent time information.

7. A media recognition system including a processor, a memory, a display unit having a display screen, and an input device, and executing predetermined recognition processing on a supplied media object to output the result of processing to said display screen, comprising:

an object management space defined in said memory;
an object processing module for processing said media object in accordance with a pattern definition list stored in said object management space; and
a media object space defined in said memory for storing new media objects generated by said object processing module,
wherein said pattern definition list includes a plurality of action statements each defining a script program to be executed, in association with a pattern formula designating attributes of each media object,
said object processing module selects a script program corresponding to said media object based on a pattern formula indicated by said pattern definition list and executes media processing in accordance with the script program, thereby to generate a new media object having different attributes, repeats recursive media processing on the generated media objects as new input media objects in accordance with said pattern definition list, and selectively outputs a media object having an attribute pre-designated in said pattern definition list to said media object space and said display unit,
wherein said pattern definition list includes an action statement defining a script program including an internal pattern formula in association with one of said pattern formulas, and
wherein the action statement including said internal pattern formula defines a script program to be executed when overlapping of a media object having specific attributes to be displayed on said display screen and a cursor whose display position varies with manipulation by the user is detected.

8. A media recognition system including a processor, a memory, a display unit having a display screen, and an input device, and executing predetermined recognition processing on a supplied media object to output the result of processing to said display screen, comprising:

an object management space defined in said memory;
an object processing module for processing said media object in accordance with a pattern definition list stored in said object management space; and
a media object space defined in said memory for storing new media objects generated by said object processing module,
wherein said pattern definition list includes a plurality of action statements each defining a script program to be executed, in association with a pattern formula designating attributes of each media object,
said object processing module selects a script program corresponding to said media object based on a pattern formula indicated by said pattern definition list and executes media processing in accordance with the script program, thereby to generate a new media object having different attributes, repeats recursive media processing on the generated media objects as new input media objects in accordance with said pattern definition list, and selectively outputs a media object having an attribute pre-designated in said pattern definition list to said media object space and said display unit, and
a syntactic interpretation routine for analyzing action statements defined in said pattern definition list, dividing the pattern definition list into a pattern formula group and a group of script programs to be executed, and storing the groups into said object management space.

* * * * *